(No Model.)

J. T. ATTERBURY.
CULTIVATOR.

No. 317,277. Patented May 5, 1885.

WITNESSES
M. E. Foulds
E. G. Siggers

INVENTOR
J. T. Atterbury
By his Attorneys
C. A. Snow & Co.

UNITED STATES PATENT OFFICE.

JOHN THOMAS ATTERBURY, OF BYNUMVILLE, MISSOURI.

CULTIVATOR.

SPECIFICATION forming part of Letters Patent No. 317,277, dated May 5, 1885.

Application filed February 17, 1885. (No model.)

*To all whom it may concern:*

Be it known that I, JOHN T. ATTERBURY, a citizen of the United States, residing at Bynumville, in the county of Chariton and State of Missouri, have invented a new and useful Improvement in Cultivators, of which the following is a specification, reference being had to the accompanying drawings.

My invention relates to an improvement in fenders for cultivators; and it consists in the peculiar construction and combination of devices that will be more fully set forth hereinafter, and particularly pointed out in the claims.

Figure 1:
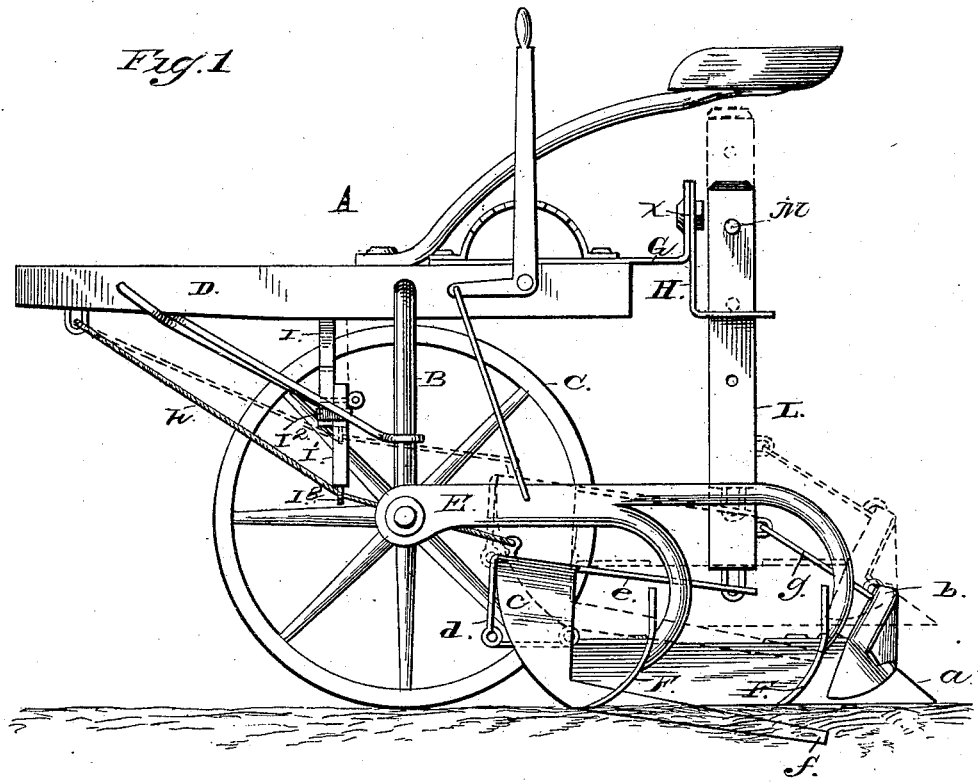
Figure 2:
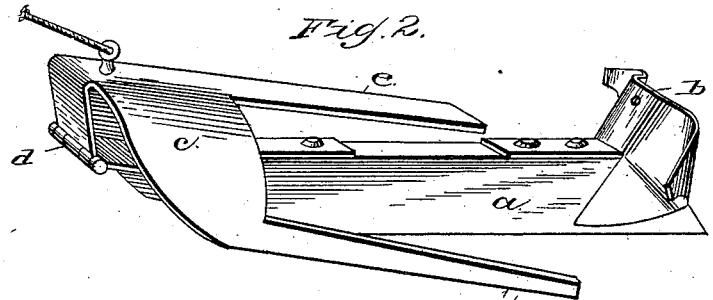
Figure 3:
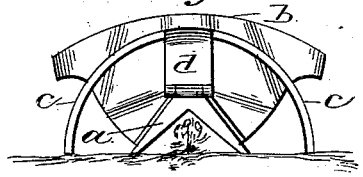

In the accompanying drawings, Figure 1 is a side elevation of a sulky-cultivator with one of my improved fenders applied thereto, the near supporting-wheel of the cultivator being removed. Fig. 2 is a detailed perspective view of my improved fender. Fig. 3 is a front elevation of the same.

A represents a sulky-cultivator, of which B represents the bent axle, C the supporting-wheels, D the tongue, E the beams that are pivoted to the axle, and F the cultivators or shovel-plows that are secured to the pivoted beams.

To the rear end of the tongue is secured a bracket, G, that projects rearwardly from the tongue, and has pivoted to it the portion H, as at $x$, in which portion is formed an opening. An arm, I, depends from the lower side of the tongue, at a suitable distance in advance of the axle, and to this arm is secured an extension, I', that slides vertically thereon, the extension being secured thereto by a loop or keeper, I². A series of openings is made in the arm, as indicated in dotted lines in Fig. 1, and a pin passes through the upper end of the extension, and is adapted to enter any of the series of openings, and thereby secure the extension to the arm at any desired point. A keeper or staple, I³, is secured to the lower end of the extension.

My fender is composed of the inverted V-shaped runner or trough $a$, near the rear end of which is secured the double turning-wing $b$, which projects laterally from each side of the runner, as shown.

$c$ represents an arch-shaped metallic portion that is secured to the front end of the runner by the double hinge $d$. From the upper side of the portion $c$ extends rearwardly the arm $e$, and from the lower sides of the portion $c$ extend rearwardly the guards or guides $f$, that are sharpened on their under sides so as to enter the ground, and are inclined on their upper edges, as shown. These guards extend nearly the length of the runner and work on each side thereof.

A post, L, is hinged to the rear end of the arm $e$, and extends vertically therefrom and passes through the loop portion H of the bracket. As this portion of the bracket is pivoted to the rigid portion, it will be understood that the sulky can tilt or incline without affecting the post L. This post is provided with a transverse opening near its upper and near its lower end, and a pin, M, is passed through either of these openings above the loop portion of the bracket H, so as to secure the post either in the position indicated by the solid lines of Fig. 1 or by the dotted lines thereof. A rod, $g$, connects the double wing $b$ with the post L.

The operation of my invention is as follows: The plants to be cultivated are planted in rows. The cultivator is drawn along these rows with the runner $a$ astride of the plants. The clods that are thrown in toward the row by the cultivator-teeth or shovel-plows fall upon the runner, which prevents them from crushing and injuring the young and tender plants. The guards $f$ enter the ground and assist in stirring the loose earth and direct and steady the motion of the runner. The wings $b$ sweep the clods out of the way, and thus only the pulverized soil is allowed to come in contact with the plants. The fender is drawn along by a chain, $h$, which is connected to the tongue, passes through the staple at the lower end of the extension of the depending arm, and is connected to the fender, as shown. When the post L is raised to the position shown in dotted lines in Fig. 1, the extension is moved up on the arm and secured there, and the fender is then raised above the ground and out of contact therewith.

A fender thus constructed is adapted to be attached to any ordinary cultivator, and insures protection to the tenderest plants. It is thoroughly efficient in operation, as I have demonstrated by actual test, and by its use much valuable time and labor may be saved.

Having thus described my invention, I claim—

1. The fender having the runner $a$, wings $b$, projecting from the sides thereof, and the arch-shaped portion hinged to the runner and having the rearwardly-extending guards, substantially as described.

2. The combination, with the cultivator having the loop H and the extensible depending arm, of the fender connected to the cultivator by a drag-chain, which is secured to the extensible arm, and the post L, secured to the fender and passing through loop H, substantially as described.

3. The combination of the cultivator having the depending extensible arm and the loop H, the fender secured to the cultivator by a drag-chain that is secured to the extensible arm, the fender having the runner $a$, wings $b$, curved portion $c$, hinged to the runner, and having the arm $e$ and rearwardly-extending guards $f$, and the post L, secured to the fender and passing through the loop H, substantially as described.

In testimony that I claim the foregoing as my own I have hereto affixed my signature in presence of two witnesses.

JOHN THOMAS ATTERBURY.

Witnesses:
J. D. BRUMMALL,
WM. WACK.